(12) United States Patent
Wallace (10) Patent No.: US 9,932,888 B2
(45) Date of Patent: Apr. 3, 2018

(54) VARIABLE GEOMETRY TURBOCHARGER (71) Applicant: BorgWarner Inc., Auburn Hills, MI (US)

(72) Inventor: Robert Wallace, Candler, NC (US)

(73) Assignee: BorgWarner Inc., Auburn Hills, MI (US)

(*) Notice: Subject to any disclaimer, the term of this patent is extended or adjusted under 35 U.S.C. 154(b) by 60 days.

(21) Appl. No.: 15/079,299

(22) Filed: Mar. 24, 2016

(65) Prior Publication Data
US 2017/0276066 A1 Sep. 28, 2017

(51) Int. Cl.
F02D 23/00 (2006.01)
F01D 17/12 (2006.01)
F02B 37/24 (2006.01)
F01D 17/16 (2006.01)
F01D 25/16 (2006.01)

(52) U.S. Cl.
CPC ............ *F02B 37/24* (2013.01); *F01D 17/165* (2013.01); *F01D 25/16* (2013.01); *F05D 2220/40* (2013.01); *F05D 2240/50* (2013.01)

(58) Field of Classification Search
CPC ...... F02B 37/24; F02B 2220/40; F01D 25/16; F01D 17/165; F02D 2240/50
USPC ..................................... 60/602; 415/159–166
See application file for complete search history.

(56) References Cited

U.S. PATENT DOCUMENTS

| 3,495,921 | A | * | 2/1970 | Swearingen | .......... | F01D 17/165 415/163 |
| 4,502,836 | A | * | 3/1985 | Swearingen | .......... | F01D 17/165 415/160 |
| 4,629,396 | A | * | 12/1986 | Lorett | .................... | F01D 17/165 415/164 |
| 4,643,640 | A | * | 2/1987 | Burdette | ............... | F01D 17/165 415/164 |
| 4,654,941 | A | * | 4/1987 | Burdette | ............... | F01D 17/165 415/164 |
| 4,880,351 | A | * | 11/1989 | Inoue | .................... | F01D 17/165 415/159 |

(Continued)

FOREIGN PATENT DOCUMENTS

| EP | 2733311 | A1 | * | 5/2014 | .......... | F01D 17/165 |
| GB | 2467382 | A |   | 8/2010 |           |             |

(Continued)

*Primary Examiner* — Thai Ba Trieu
(74) *Attorney, Agent, or Firm* — Miller, Matthias & Hull LLP (57) ABSTRACT A turbocharger turbine section is disclosed. The turbine may include a first swing vane rotatably coupled with a first pin that may include a first leading edge, a first trailing edge, a first exhaust side edge extending between the first leading edge and the first trailing edge and a first bearing side edge extending between the first leading edge and the first trailing edge. Furthermore, the turbine may include a second swing vane rotatably coupled with a second pin that may include a second leading edge, a second trailing edge, a second exhaust side edge extending between the second leading edge and the second trailing edge and a second bearing side edge extending between the second leading edge and the second trailing edge. Moreover, the turbine may include an exhaust side nozzle wall, a bearing side nozzle wall opposite the exhaust side nozzle wall and a turbine wheel.

14 Claims, 6 Drawing Sheets (56) References Cited

U.S. PATENT DOCUMENTS

| | | | |
|---|---|---|---|
| 4,973,223 A | 11/1990 | Franklin | |
| 6,558,117 B1 | 5/2003 | Fukaya et al. | |
| 6,652,224 B2 | 11/2003 | Mulloy et al. | |
| 6,729,134 B2 | 5/2004 | Arnold et al. | |
| 7,024,855 B2 | 4/2006 | Perrin et al. | |
| 7,497,654 B2 | 3/2009 | Lavez et al. | |
| 7,628,580 B2 | 12/2009 | Parker et al. | |
| 8,641,372 B2 * | 2/2014 | Stein | F01D 17/165 415/160 |
| 8,662,833 B2 * | 3/2014 | Wengert | F01D 17/165 415/160 |
| 8,764,388 B2 | 7/2014 | Roberts et al. | |
| 2011/0014034 A1 * | 1/2011 | Blummel | F01D 17/165 415/151 |

FOREIGN PATENT DOCUMENTS

| | | | | |
|---|---|---|---|---|
| WO | WO 2004036010 A2 * | 4/2004 | | F01D 17/165 |
| WO | 2014018272 A1 | 1/2014 | | |
| WO | 2014132727 A1 | 4/2014 | | |

\* cited by examiner

VARIABLE GEOMETRY TURBOCHARGER

TECHNICAL FIELD

This disclosure generally relates to an engine system and, more particularly, relates to a variable geometry turbocharger for an engine system.

BACKGROUND

An engine system may include an engine, an exhaust conduit, a turbocharger and an inlet conduit. The turbocharger may include a turbine section fluidly coupled with the engine via the exhaust conduit and a compressor section fluidly coupled to the engine via the inlet conduit. The turbine section may be configured to extract work from an exhaust stream passing through the exhaust conduit. The turbocharger may also be configured to pass this work to the compressor section where the compressor section may be configured to conduct work on an inlet stream passing through the inlet conduit.

The turbine section may include a volute, a nozzle section fluidly downstream of the volute and a turbine wheel turbine wheel fluidly downstream of the nozzle section. The volute may be configured to slow the velocity of the exhaust stream entering the remainder of the turbine section. Subsequently, the exhaust stream may enter the nozzle section where the exhaust stream speed is increased and directed to a turbine wheel. Finally, the exhaust stream may be passed by the turbine wheel where work is extracted from the exhaust stream.

Customarily, the nozzle section may include a first wastegate and a second wastegate positioned adjacent to the first wastegate to form a nozzle. In this design, the spacing and angle between the first wastegate and the second wastegate may be permanently set at a specific distance and angle thereby leading to lower torque than possible at low engine speeds, throttling issues as engine speed is increased and less efficient operation than is possible. To resolve these issues turbocharger designers have more recently utilized variable geometry turbochargers utilizing swing gate technology in the nozzle section. While swing gate technology may resolve the foregoing issues there is still room for improvement.

The present disclosure is directed to overcoming one or more problems set forth above and/or other problems associated with known swing gate turbocharger turbine sections.

SUMMARY

In accordance with one aspect of the present disclosure, a turbocharger turbine section is disclosed. The turbine section may include a first swing vane rotatably coupled with a first pin. The first swing vane may include a first leading edge, a first trailing edge, a first exhaust side edge extending between the first leading edge and the first trailing edge and a first bearing side edge extending between the first leading edge and the first trailing edge. The turbine section may further include a second swing vane rotatably coupled with a second pin positioned adjacent the first swing vane. The second swing vane may include a second leading edge, a second trailing edge, a second exhaust side edge extending between the second leading edge and the second trailing edge and a second bearing side edge extending between the second leading edge and the second trailing edge. In addition the turbine may include an exhaust side nozzle wall and a bearing side nozzle wall opposite the exhaust side nozzle wall. Finally, the turbine section may include a turbine wheel.

In accordance with another aspect of the present disclosure, an engine system is disclosed. The engine system may include an engine and an exhaust conduit downstream of and fluidly coupled with the engine. The exhaust conduit may be configured to transport an exhaust stream away from the engine. Furthermore, the engine system may include a turbocharger including a turbine section. The turbine section may be fluidly coupled with the exhaust conduit and be configured to extract work from the exhaust stream and the turbine section may also include a nozzle. The nozzle may include a first swing vane rotatably coupled with a first pin. The first swing vane may include a first leading edge, a first trailing edge, a first exhaust side edge extending between the first leading edge and the first trailing edge and a first bearing side edge extending between the first leading edge and the first trailing edge. The nozzle may further include a second swing vane rotatably coupled with a second pin positioned adjacent the first swing vane. The second swing vane may include a second leading edge, a second trailing edge, a second exhaust side edge extending between the second leading edge and the second trailing edge and a second bearing side edge extending between the second leading edge and the second trailing edge. In addition the nozzle may include an exhaust side nozzle wall and a bearing side nozzle wall opposite the exhaust side nozzle wall. Finally, the nozzle may include a turbine wheel.

These and other aspects and features of the present disclosure will be more readily understood when read in conjunction with the accompanying drawings.

BRIEF DESCRIPTION

FIG. 1 is a block diagram of an exemplary engine system according to one aspect of the present disclosure.

FIG. 2 is a cross-sectional view of turbocharger manufactured in accordance with the present disclosure that may be utilized with the exemplary engine system according to FIG. 1.

FIG. 3 is a partial plan view along line 3-3 of FIG. 2 of a turbocharger turbine section manufactured in accordance with the present disclosure that may be utilized with the turbocharger of FIG. 2.

FIG. 4 is an enlarged cross-sectional view of the turbocharger turbine section manufactured in accordance with the present disclosure that may be utilized with the turbocharger of FIG. 2.

FIG. 5 is an enlarged cross-sectional view of a first embodiment of a nozzle section of the turbocharger turbine section manufactured in accordance with the present disclosure that may be utilized with the turbocharger of FIG. 2.

FIG. 6 is an enlarged cross-sectional view of a second embodiment of a nozzle section of the turbocharger turbine section manufactured in accordance with the present disclosure that may be utilized with the turbocharger of FIG. 2.

DETAILED DESCRIPTION OF THE DISCLOSURE

Various aspects of the disclosure will now be described with reference to the drawings, wherein like reference numbers refer to like elements, unless specified otherwise. Referring to FIG. 1, a block diagram of an exemplary engine system 10 is illustrated, according to an aspect of the disclosure. The engine system 10 may include an engine 12, which may be an internal combustion engine such as a reciprocating piston engine or a gas turbine engine, for example. According to an aspect of the disclosure, the engine 12 is a gas turbine engine, a spark ignition engine or a compression ignition engine such as a diesel engine, or other compression ignition engine 12 known in the art. The engine 12 may be used to provide power to any machine including, but not limited to, an automobile, marine vehicle, electrical generator, pump, an on-highway truck, an off-highway truck or the like. In one embodiment, the engine 12 may be used to provide power to an on-highway truck. However, engine system 10 may be associated with any industry including, but not limited to, transportation, construction, forestry, agriculture, material handling, shipping and the like.

Figure 1:
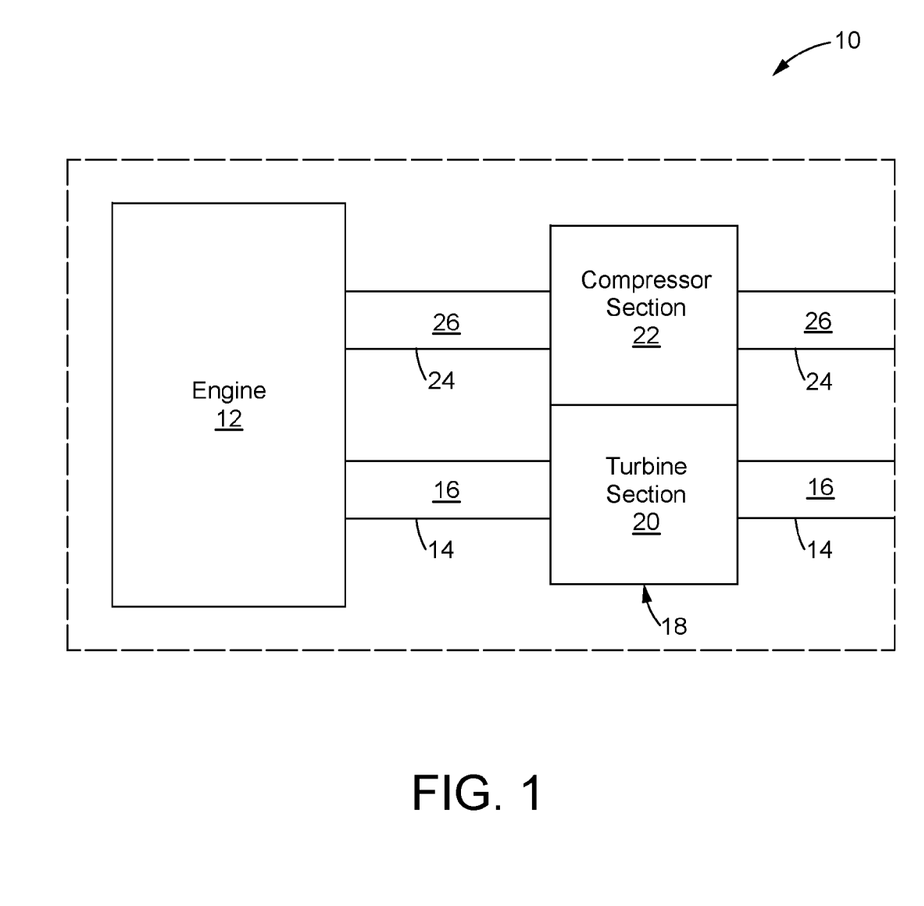
Figure 2:
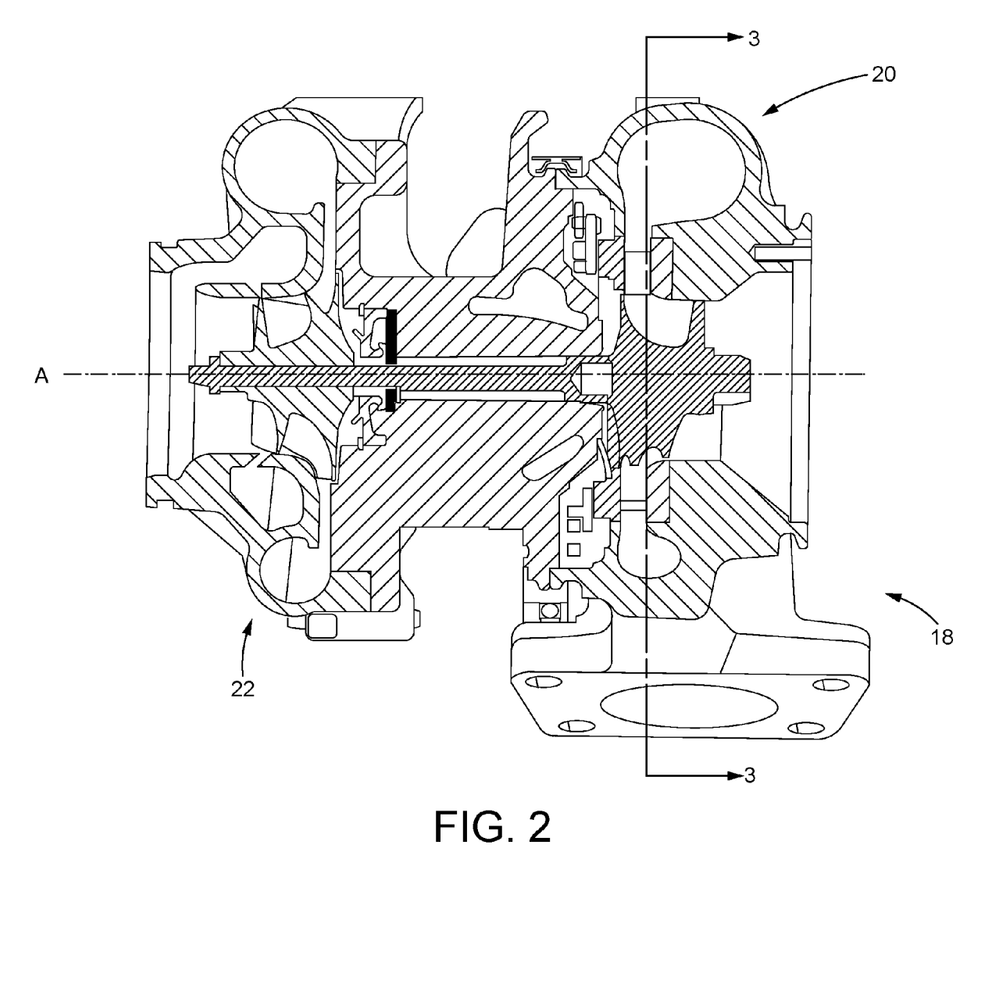

The engine system 10 may include an exhaust conduit 14 downstream of and fluidly coupled to the engine 12. The exhaust conduit 14 may be configured to transport an exhaust stream 16 away from the engine 12. The engine system 10 may also include a turbocharger that is located fluidly downstream of the engine 12. Referring now to FIGS. 1 and 2, the turbocharger 18 may include a turbine section 20 that is fluidly coupled with the exhaust conduit 14 and be configured to extract work from the exhaust stream 16. The turbocharger 18 may further include a compressor section 22 that is fluidly coupled with an inlet conduit 24 and be configured to increase the pressure of an inlet stream 26 of the engine 12. Finally, the turbocharger 18 may include an axis of rotation A about which the turbocharger 18 rotates.

Figure 3:
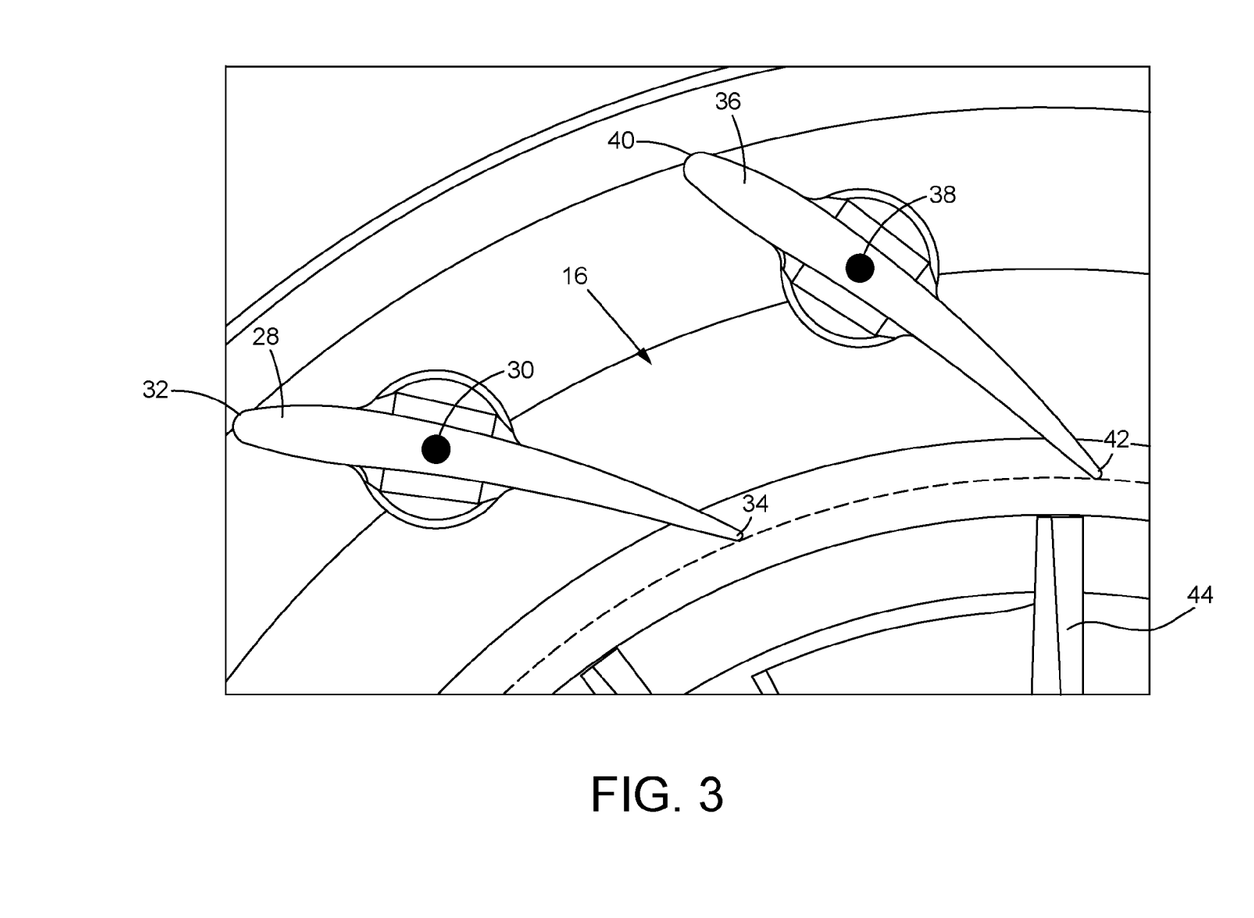

Referring now to FIG. 3, a partial plan view along line 3-3 of FIG. 2 of the turbine section 20 of the turbocharger 18 of FIG. 2 is depicted. As seen therein, the turbine section 20 may include a first swing vane 28 rotatably coupled with a first pin 30 and the first swing vane 28 may include a first leading edge 32 and a first trailing edge 34. Furthermore, the turbine section 20 may additionally include a second swing vane 36 rotatably coupled with a second pin 38 and may include a second leading edge 40 and a second trailing edge 42. Moreover, the second swing vane 36 may be positioned adjacent the first swing vane 28.

The first swing vane 28 and the second swing vane 36 may be rotatable between a closed position and an open position. In the closed position the first trailing edge 34 abuts the second leading edge 40 thereby inhibiting the passage of the exhaust stream 16 through the turbine section 20. In the open position, the first trailing edge 34 and the second trailing edge 42 may be oriented towards a turbine wheel 44 thereby allowing passage of the exhaust stream 16 through the turbine section 20 so work may be extracted from the exhaust stream 16 and transferred to the compressor section 22.

Figure 4:
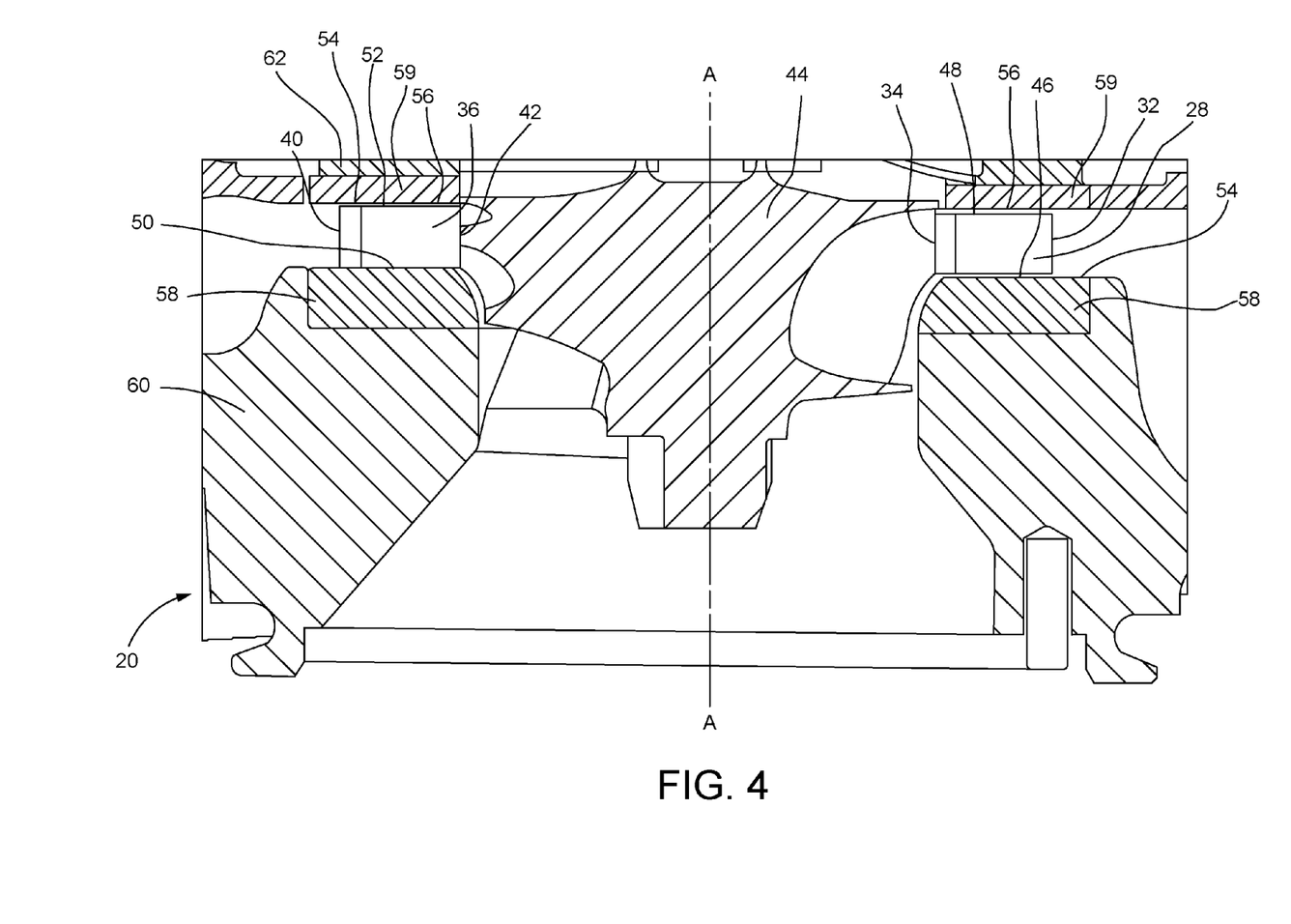

Turning now to FIG. 4, an enlarged view of the turbine section 20 of the turbocharger 18 of FIG. 2 is illustrated. As seen therein, the first swing vane 28 may include a first exhaust side edge 46 extending between the first leading edge 32 and the first trailing edge 34. Moreover, the first swing vane 28 may include a first bearing side edge 48 extending between the first leading edge 32 and the first trailing edge 34. Additionally, as seen therein, the second swing vane 36 may include a second exhaust side edge 50 extending between the second leading edge 40 and the second trailing edge 42 in addition to a second bearing side edge 52 extending between the second leading edge 40 and the second trailing edge 42. It is to be understood that although the first swing vane 28 and second swing vane 36 depicted in FIG. 4 are not positioned adjacent to each other such as in FIG. 3, the vanes in FIG. 4 have equivalent structure to the vanes in FIG. 3.

Furthermore, the turbine section 20 may include an exhaust side nozzle wall 54 and a bearing side nozzle wall 56 opposite the exhaust side nozzle wall 54. Additionally, the turbine section 20 may include a first vane ring 58 and in one embodiment this first vane ring 58 may define the exhaust side nozzle wall 54. Furthermore, in another embodiment the turbine section 20 may include a second vane ring 59 and this second vane ring 59 may define the bearing side nozzle wall 56. In addition, the turbine section 20 may include an exhaust housing 60. In another embodiment the turbine section 20 lacks the first vane ring 58 and the exhaust side nozzle wall 54 is an internal surface of the exhaust housing 60. Furthermore, in another instance, the turbine section 20 may include a bearing housing 62 and the bearing side nozzle wall 56 is an internal surface of the bearing housing 62.

Figure 5:
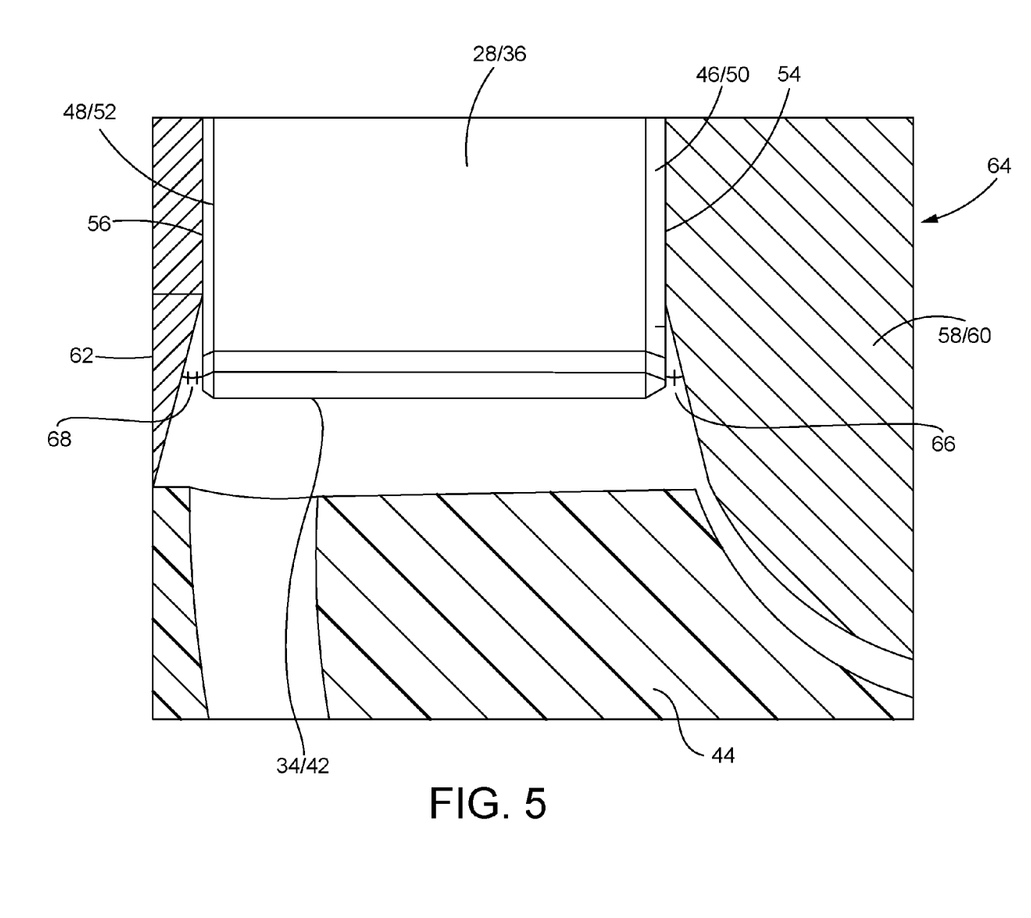

Referring now to FIG. 5, an enlarged view of a first embodiment of a nozzle section 64 of the turbine section 20 of the turbocharger 18 of FIG. 2 is depicted. As seen therein, while in the open position the first trailing edge 34 of the first swing vane 28 and the second trailing edge 42 of the second swing vane 36 are oriented towards the turbine wheel 44. Further, as depicted, while in this open position a portion of the exhaust side nozzle wall 54 diverges away from the first exhaust side edge 46 and second exhaust side edge 50 thereby increasing volumetric flowrate of the exhaust stream 16 through the turbine section 20. Further, while in the closed position, the exhaust side nozzle wall 54 is parallel with the first exhaust side edge 46 and the second exhaust side edge 50.

Additionally, the portion of the exhaust side nozzle wall 54 that diverges away from the first exhaust side edge 46 and the second exhaust side edge 50 may include a first divergence angle 66. The first divergence angle 66 may be defined as the angle between a chord coextensive with the first exhaust side edge 46 and the second exhaust side edge 50 and the portion of the exhaust side nozzle wall 54 that diverges away from this chord. In one embodiment, the first divergence angle 66 is greater than or equal to one degree and less than or equal to eighty nine degrees. In an additional embodiment, the first divergence angle 66 is greater than or equal to one degree and less than or equal to sixty degrees. In a further embodiment, the first divergence angle 66 is greater than or equal to one degree and less than or equal to forty five degrees.

As additionally depicted in FIG. 5, while in the open position a portion of the bearing side nozzle wall 56 diverges away from the first bearing side edge 48 and second bearing side edge 52 thereby increasing volumetric flowrate of the exhaust stream 16 through the turbine section 20. Further, while in the closed position, the bearing side nozzle wall 56 may be parallel with the first bearing side edge 48 and the second bearing side edge 52.

Additionally, the portion of the bearing side nozzle wall 56 that diverges away from the first bearing side edge 48 and the second bearing side edge 52 may include a second divergence angle 68. The second divergence angle 68 may be defined as the angle between a chord coextensive with the first bearing side edge 48 and the second bearing side edge 52 and the portion of the bearing side nozzle wall 56 that diverges away from this chord. In one embodiment, the second divergence angle 68 is greater than or equal to one degree and less than or equal to eighty nine degrees. In an additional embodiment, the second divergence angle 68 is greater than or equal to one degree and less than or equal to sixty degrees. In a further embodiment, the second divergence angle 68 is greater than or equal to one degree and less than or equal to forty five degrees.

Figure 6:
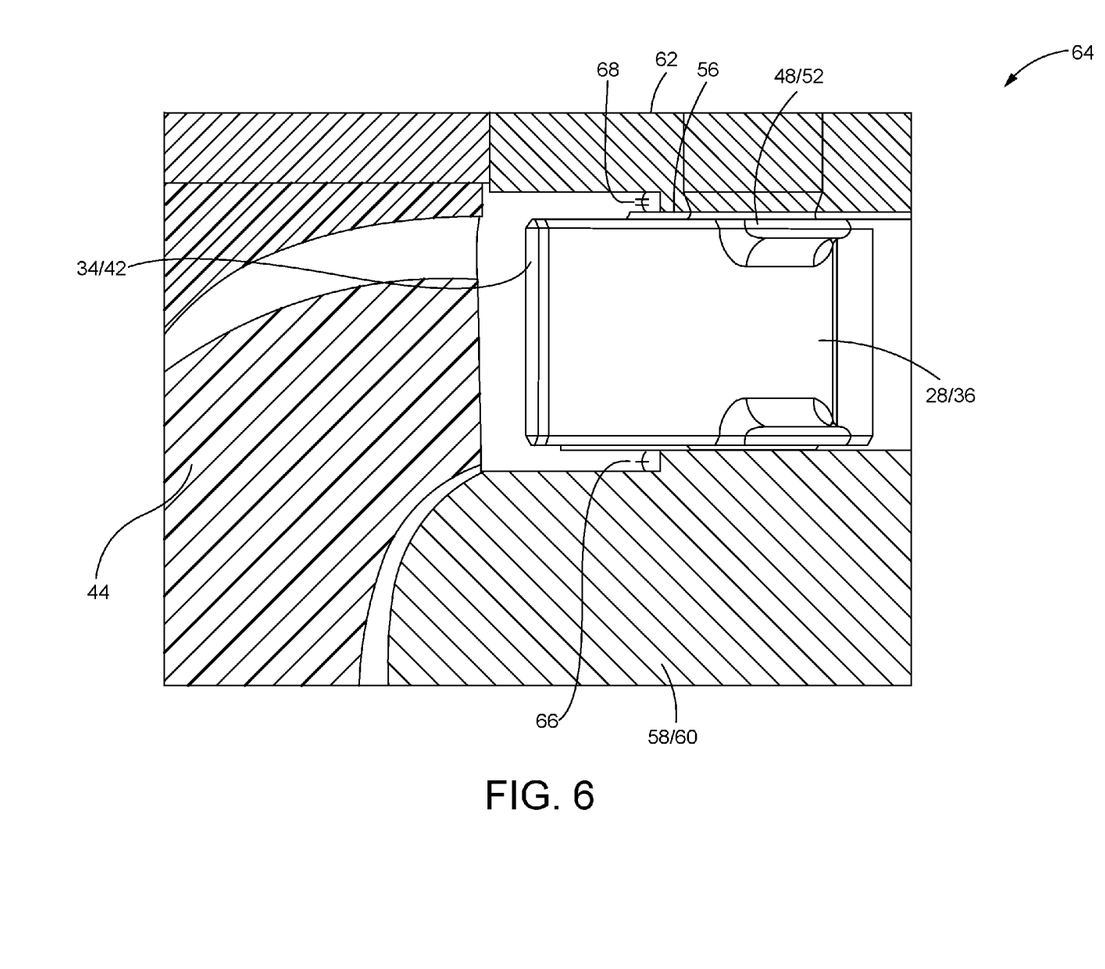

Referring now to FIG. 6, an enlarged view of a second embodiment of a nozzle section 64 of the turbine section 20 of the turbocharger 18 of FIG. 2 is depicted. As seen therein, while in the open position the first trailing edge 34 of the first swing vane 28 and the second trailing edge 42 of the second swing vane 36 are oriented towards the turbine wheel 44. Further, as depicted, while in this open position a portion of the exhaust side nozzle wall 54 diverges away from the first exhaust side edge 46 and second exhaust side edge 50 thereby increasing volumetric flowrate of the exhaust stream 16 through the turbine section 20. Further, while in the closed position, the exhaust side nozzle wall 54 is parallel with the first exhaust side edge 46 and the second exhaust side edge 50. Additionally, the portion of the exhaust side nozzle wall 54 that diverges away from the first exhaust side edge 46 and the second exhaust side edge 50 may include a first divergence angle 66. However, as seen in this figure, rather than being generally sloped, the first divergence angle 66 in this second embodiment is equal to ninety degrees.

Furthermore, as is depicted FIG. 6 illustrating a second embodiment of a nozzle section 64 of the turbine section 20 of the turbocharger 18 of FIG. 2, while in the open position a portion of the bearing side nozzle wall 56 diverges away from the first bearing side edge 48 and second bearing side edge 52 thereby increasing volumetric flowrate of the exhaust stream 16 through the turbine section 20. Further, while in the closed position, the bearing side nozzle wall 56 may be parallel with the first bearing side edge 48 and the second bearing side edge 52. Additionally, the portion of the bearing side nozzle wall 56 that diverges away from the first bearing side edge 48 and the second bearing side edge 52 may include a second divergence angle 68. However, as seen in this figure, rather than being generally sloped, the second divergence angle 68 in this second embodiment is equal to ninety degrees.

INDUSTRIAL APPLICABILITY

In operation, the teachings of the present disclosure can find applicability in many industrial applications, such as, but not limited to, use in an engine system 10 supplying power to an automobile, on-highway truck, an off-highway truck, marine vehicle, electric generator, pump or the like. The engine system 10 may include an engine 12, which may be an internal combustion engine such as a reciprocating piston engine or a gas turbine engine, for example. The engine 12 may be used to provide power to any machine including, but not limited to, an automobile, marine vehicle, electrical generator, pump, an on-highway truck, an off-highway truck or the like. In one embodiment, the engine 12 may be used to provide power to an on-highway truck. However, engine system 10 may be associated with any industry including, but not limited to, transportation, construction, forestry, agriculture, material handling, shipping and the like.

Further, the engine system 10 may include a turbocharger 18 including a turbine section 20. The turbine section 20 may utilize a nozzle section 64 including an exhaust side nozzle wall 54 that diverges away from the first exhaust side edge 46 of a first swing vane 28 and a second exhaust side edge 50 of second swing vane 36 positioned adjacent to the first swing vane 28. Moreover, the nozzle section 64 may additionally include a bearing side nozzle wall 56 that diverges away from a first bearing side edge 48 of the first swing vane 28 and a second bearing side edge 52 of the second swing vane 36 positioned adjacent to the first swing vane 28. The portions of the exhaust side nozzle wall 54 and bearing side nozzle wall 56 that diverge may be placed anywhere between a first pin 30, or a second pin 38, and the outer circumference of a turbine wheel 44. Furthermore, a first divergence angle 66 and a second divergence angle 68 of the present disclosure may be varied between one degree and ninety degrees. This tunability offers turbocharger 18 designers flexibility in matching the maximum volumetric flowrate of the exhaust stream 16 through the turbine section 20 with the operational speed of the engine 12 to which the turbocharger 18 is coupled thereby leading to increased efficiency for the engine system.

The above description is meant to be representative only, and thus modifications may be made to the embodiments described herein without departing from the scope of the disclosure. Thus, these modifications fall within the scope of the present disclosure and are intended to fall within the appended claims.

What is claimed is:

1. A turbocharger turbine section, comprising:
a first swing vane rotatably coupled with a first pin, the first swing vane including a first leading edge, a first trailing edge, a first exhaust side edge extending between the first leading edge and the first trailing edge and a first bearing side edge extending between the first leading edge and the first trailing edge;
a second swing vane rotatably coupled with a second pin, the second swing vane positioned adjacent the first swing vane and including a second leading edge, a second trailing edge, a second exhaust side edge extending between the second leading edge and the second trailing edge and a second bearing side edge extending between the second leading edge and the second trailing edge;
an exhaust side nozzle wall;
a bearing side nozzle wall opposite the exhaust side nozzle wall; and
a turbine wheel, the first and second swing vanes being rotatable between an open position and a closed position, the exhaust side nozzle wall having a non-sloped portion that diverges away from both the first exhaust side edge and the second exhaust side edge when the first and second swing vanes are in the open position.

2. The turbocharger turbine section according to claim 1, wherein the first swing vane and the second swing vane are rotatable between the closed position wherein the first trailing edge abuts the second leading edge and the open position wherein the first trailing edge and the second trailing edge are oriented towards the turbine wheel, wherein while in the closed position the exhaust side nozzle wall is parallel with the first exhaust side edge and the second exhaust side edge.

3. The turbocharger turbine section according to claim 2, wherein the non-sloped portion of the exhaust side nozzle wall that diverges away from the first exhaust side edge and the second exhaust side edge further includes a first divergence angle, wherein the first divergence angle is equal to 90 degrees and wherein the exhaust side nozzle wall is an internal surface of an exhaust housing.

4. The turbocharger turbine section according to claim 1, wherein the first swing vane and the second swing vane are rotatable between a the closed position wherein the first trailing edge abuts the second leading edge and mi the open position wherein the first trailing edge and the second trailing edge are oriented towards the turbine wheel, wherein while in the closed position the bearing side nozzle wall is parallel with the first bearing side edge and the second bearing side edge, and wherein while in the open position a portion of the bearing side nozzle wall diverges away from the first bearing side edge and the second bearing side edge.

5. The turbocharger turbine section according to claim 4, wherein the portion of the bearing side nozzle wall that diverges away from the first bearing side edge and the second bearing side edge further includes a second divergence angle, and wherein the bearing side nozzle wall is an internal surface of a bearing housing.

6. The turbocharger turbine section according to claim 4, wherein the portion of the bearing side nozzle wall that diverges away from the first bearing side edge and the second bearing side edge is non-sloped and further includes a second divergence angle, wherein the second divergence angle is equal to 90 degrees and wherein the bearing side nozzle wall is an internal surface of a bearing housing.

7. The turbocharger turbine section according to claim 1, wherein the first swing vane and the second swing vane are rotatable between a the closed position wherein the first trailing edge abuts the second leading edge and an the open position wherein the first trailing edge and the second trailing edge are oriented towards the turbine wheel, wherein while in the closed position the exhaust side nozzle wall is parallel with the first exhaust side edge and the second exhaust side edge, wherein while in the closed position the bearing side nozzle wall is parallel with the first bearing side edge and the second bearing side edge, and wherein while in the open position a portion of the bearing side nozzle wall diverges away from the first bearing side edge and the second bearing side edge.

8. The turbocharger turbine section according to claim 7, wherein the portion of the exhaust side nozzle wall that diverges away from the first exhaust side edge and the second exhaust side edge further includes a first divergence angle, wherein the exhaust side nozzle wall is an internal surface of an exhaust housing, wherein the portion of the bearing side nozzle wall that diverges away from the first bearing side edge and the second bearing side edge further includes a second divergence angle, and wherein the bearing side nozzle wall is an internal surface of a bearing housing.

9. The turbocharger turbine section according to claim 7, wherein the non-sloped portion of the exhaust side nozzle wall that diverges away from the first exhaust side edge and the second exhaust side edge further includes a first divergence angle and further wherein the first divergence angle is equal to 90 degrees, wherein the exhaust side nozzle wall is an internal surface of an exhaust housing, wherein the portion of the bearing side nozzle wall that diverges away from the first bearing side edge and the second bearing side edge is non-sloped and further includes a second divergence angle, wherein the second divergence angle is equal to 90 degrees and wherein the bearing side nozzle wall is an internal surface of a bearing housing.

10. An engine system, comprising:
an engine;
an exhaust conduit downstream of and fluidly coupled with the engine configured to transport an exhaust stream away from the engine; and
a turbocharger including a turbine section, the turbine section fluidly coupled with the exhaust conduit and configured to extract work from the exhaust stream, the turbine section including a nozzle, the nozzle including a first swing vane rotatably coupled with a first pin and a second swing vane rotatably coupled with a second pin positioned adjacent the first swing vane, the first swing vane including a first leading edge, a first trailing edge, a first exhaust side edge extending between the first leading edge and the first trailing edge and a first bearing side edge extending between the first leading edge and the first trailing edge, the second swing vane including a second leading edge, a second trailing edge, a second exhaust side edge extending between the second leading edge and the second trailing edge and a second bearing side edge extending between the second leading edge and the second trailing edge, the nozzle further including an exhaust side nozzle wall and a bearing side nozzle wall opposite the exhaust side nozzle wall and a turbine wheel, the first and second swing vanes being rotatable between an open position and a closed position, the exhaust side nozzle wall having a non-sloped portion that diverges away from both the first exhaust side edge and the second exhaust side edge by a divergence angle of 90 degrees when the first and second swing vanes are in the open position.

11. The engine system according to claim 10, wherein the first swing vane and the second swing vane are rotatable between the closed position wherein the first trailing edge abuts the second leading edge and the open position wherein the first trailing edge and the second trailing edge are oriented towards the turbine wheel, wherein while in the closed position the exhaust side nozzle wall is parallel with the first exhaust side edge and the second exhaust side edge, and wherein the exhaust side nozzle wall is an internal surface of an exhaust housing.

12. The engine system according to claim 10, wherein the first swing vane and the second swing vane are rotatable between a the closed position wherein the first trailing edge abuts the second leading edge and an the open position wherein the first trailing edge and the second trailing edge are oriented towards the turbine wheel, wherein while in the closed position the bearing side nozzle wall is parallel with the first bearing side edge and the second bearing side edge, and wherein the bearing side nozzle wall is an internal surface of a bearing housing.

13. The engine system according to claim 10, wherein the first swing vane and the second swing vane are rotatable between a the closed position wherein the first trailing edge abuts the second leading edge and an die open position wherein the first trailing edge and the second trailing edge are oriented towards the turbine wheel, wherein while in the closed position the exhaust side nozzle wall is parallel with the first exhaust side edge and the second exhaust side edge, wherein while in the closed position the bearing side nozzle wall is parallel with the first bearing side edge and the second bearing side edge, wherein the exhaust side nozzle wall is an internal surface of an exhaust housing and the bearing side nozzle wall is an internal surface of a bearing housing.

14. The engine system according to claim 10, wherein the first swing vane and the second swing vane are rotatable between a the closed position wherein the first trailing edge abuts the second leading edge and an the open position wherein the first trailing edge and the second trailing edge are oriented towards the turbine wheel, wherein while in the closed position the exhaust side nozzle wall is parallel with the first exhaust side edge and the second exhaust side edge, wherein while in the closed position the bearing side nozzle wall is parallel with the first bearing side edge and the second bearing side edge, wherein while in the open position a portion of the exhaust-side nozzle wall diverges away from both the first exhaust side edge and the second exhaust side edge at first divergence equal to 90 degrees, wherein while in the open position a non-sloped portion of the bearing side nozzle wall diverges away from the first bearing side edge and the second bearing side edge at a second divergence angle equal to 90 degrees, and wherein the exhaust side nozzle wall is an internal surface of an exhaust housing and the bearing side nozzle wall is an internal surface of a bearing housing.

* * * * *